United States Patent Office 3,699,115
Patented Oct. 17, 1972

3,699,115
3-ARYL-ISOTHIAZOLE-4,5-DICARBOXYLATES
John E. Franz, Crestwood, Mo., assignor to Monsanto Company, St. Louis, Mo.
No Drawing. Filed Nov. 25, 1969, Ser. No. 879,927
Int. Cl. C07d *91/12*
U.S. Cl. 260—302 A                7 Claims

ABSTRACT OF THE DISCLOSURE

Preparation of 3-aryl-isothiazole - 4,5 - dicarboxylates from 5-aryl-1,3,4-oxathiazol-2-ones and acetylenedicarboxylic acid esters and their use as contact broadleaf herbicides.

---

This invention relates to 3-aryl-isothiazole-4,5-dicarboxylates of the formula

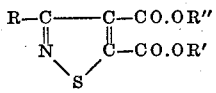

the preparation thereof from the appropriate 5-aryl-1,3,4-oxathiazol-2-one of the formula

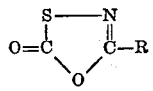

and the appropriate acetylenedicarboxylate of the formula

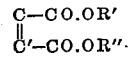

where in the foregoing R is phenyl, p-tolyl, p-methoxyphenyl, p-chlorophenyl or p-nitrophenyl, and wherein R' and R" are like or unlike such as lower alkyl (that is methyl, ethyl, propyl and butyl and the various isomeric forms thereof having up to and including 4 carbon atoms) and lower alkoxyalkyl (that is methoxyethyl, ethoxyethyl, isopropoxymethyl, and the various isomeric forms thereof having up to and including 4 carbon atoms), and the contact or post-emergent broadleaf herbicidal use thereof.

As illustrative of the preparation of the compounds of this invention but not limitative thereof is the following:

EXAMPLE I

To a suitable reaction vessel equipped with a thermometer and agitator is charged approximately 0.5 part weight (substantially 0.0028 mole) of 5-phenyl-1,3,4-oxathiazol-2-one and approximately 0.40 part by weight (substantially 0.0028 mole) of dimethyl acetylenedicarboxylate and with agitation the mass is heated at about 140° C. for about 16 hours to evolve carbon dioxide. The residue, a clear brown oil, is dissolved in diethyl ether and recrystallized therefrom. The product is colorless crystalline dimethyl 3-phenyl-isothiazole-4,5-dicarboxylate (M.P. 72–73° C.).

EXAMPLE II

Employing the procedure of Example I but replacing dimethyl acetylenedicarboxylate with a substantially equimolecular proportion of diethyl acetylenedicarboxylate there is obtained diethyl 3-phenyl-isothiazole-4,5-dicarboxylate.

EXAMPLE III

Employing the procedure of Example I but replacing 5-phenyl-1,3,4-oxathiazol-2-one with a substantially equimolecular proportion of 5-(p-chlorophenyl)-1,3,4-oxathiazol-2-one there is obtained dimethyl 3-(p-chlorophenyl)-isothiazole-4,5-dicarboxylate.

EXAMPLE IV

Employing the procedure of Example I but replacing dimethyl acetylenedicarboxylate with a substantially equimolecular proportion of di(2-ethoxyethyl) acetylenedicarboxylate there is obtained di(2-ethoxyethyl) 3-phenyl-isothiazole-4,5-dicarboxylate.

EXAMPLE V

Employing the procedure of Example I but replacing 5-phenyl-1,3,4-oxathiazol-2-one with a substantially equimolecular amount of 5-(p-nitrophenyl)-1,3,4-oxathiazol-2-one there is obtained dimethyl 3-(p-nitrophenyl)-isothiazole-4,5-dicarboxylate.

EXAMPLE VI

Employing the procedure of Example I but replacing 5-phenyl-1,3,4-oxathiazol-2-one with a substantially equimolecular amount of 5-(p-methoxyphenyl)-1,3,4-oxathiazol-2-one there is obtained dimethyl 3-(p-methoxyphenyl)-isothiazole-4,5-dicarboxylate.

EXAMPLE VII

Employing the procedure of Example I but replacing 5-phenyl-1,3,4-oxathiazol-2-one with a substantially equimolecular amount of 5-(p-tolyl)-1,3,4-oxathiazol-2-one there is obtained dimethyl 3-(p-tolyl)-isothiazole-4,5-dicarboxylate.

Other compounds of this invention prepared as aforedescribed from the appropriate 5-aryl-1,3,4-thiazol-2-one and appropriate acetylenedicarboxylate include diethyl 3-phenyl-isothiazole-4,5-dicarboxylate,
diisopropyl 3-phenyl-isothiazole-4,5-dicarboxylate,
di(sec.butyl) 3-phenyl-isothiazole-4,5-dicarboxylate,
diethyl 3(p-chlorophenyl)-isothiazole-4,5-dicarboxylate,
di-n-propyl 3-(p-nitrophenyl)-isothiazole-4,5-dicarboxylate,
di(2-ethoxyethyl) 3-(p-chlorophenyl)-isothiazole-4,5-diboxylate,
di(tert.butyl) 3-(p-chlorophenyl)-isothiazole-4,5-dicarboxylate, etc.

The compounds of this invention are soluble in many organic solvents, for example acetone, diethylether, butanone, benzene, toluene, xylene, dimethyl formamide, ethyl acetate, ethanol, isopropanol, and the like. These solvents, provided they are inert in the reactive system, can be employed in the aforedescribed method of making the compounds of this invention. The sole provision of the process of this invention is the heating to evolve carbon dioxide, with the obvious exception of reaction temperatures not inclusive of the decomposition point of the respective reactants or compounds of this invention produced thereby. While reduced pressures can be employed, ordinarily atmospheric pressure is satisfactory.

The compounds of this invention are contact or postemergent broadleaf herbicides and to illustrate such but not limitative thereof is the following:

Dimethyl 3 - phenyl - isothiazole - 4,5 - dicarboxylate is applied as a spray having a concentration of 0.5 percent by weight thereof in water at a rate of said compound of 10 pounds per acre to a plot having fourteen (14) day established growths of radish, sugar beet, pigweed, wild buckwheat, sorghum and ryegrass. An inspection of the plot conducted fourteen (14) days after the spray application revealed the following results:

| Plant species | Herbicidal effect* |
|---|---|
| Radish | 4 |
| Sugar beet | 4 |
| Pigweed | 4 |
| Wild buckwheat | 3 |
| Rye grass | 0 |
| Sorghum | 0 |

*The relative value of the compound evaluated with respect to its post-emergent herbicidal effect on each plant species is indicated by a number as follows: 0=no growth inhibition; 1=slight growth inhibition; 2=moderate growth inhibition; 3=severe growth inhibition; 4=complete kill.

From the foregoing evaluation date it is apparent that the compounds of this invention are effective broadleaf post-emergent herbicides. Valuable herbicidal effects will be observed by applications of small amounts, for example, as low as 0.1 lbs. of active component per acre as well as high concentrations, for example, 100 lbs. per acre. The preferred range of application is from about 1 to about 15 lbs. per acre.

It will be apparent that quite different effects can be obtained by modifying the method of use. For this reason an essential part of this invention is the formulation so as to permit a uniform predetermined application of herbicide to the growing noxious broadleaf plant so as to produce the desired effect. By proper selection and proportioning of the various extending agents either liquid or solid formulations can be prepared, and so as to adapt the herbicide for achieving the desired result with any conventional device for applying to the plants.

Although the compounds of this invention are useful per se in controlling the growth of a wide variety of broadleaf plants, it is preferable that they be supplied to the growing plant in a dispersed form in a suitable extending agent.

In the instant specification and appended claims it is to be understood that the term "dispersed" is used in its widest possible sense. When it is said that the compounds of this invention are dispersed, it means that the particles of the compounds of this invention may be molecular in size and held in true solution in a suitable organic solvent. It means further that the particles may be colloidal in size and distributed throughout a liquid phase in the form of suspensions or emulsions or in the form of particles held in suspension by wetting agents. The term "dispersed" also means that the particles may be mixed with and distributed throughout a solid carrier providing a mixture in particulate form, e.g. pellets, granules, powders, or dusts.

In the instant specification and appended claims it is to be understood that the expression "extending agent" includes any and all of those substances in which the compounds of this invention are dispersed. It includes, therefore, the solvents of a true solution, the liquid phase of suspensions, or emulsions and the solid phase of particulate solids, e.g. pellets, granules, dusts and powders.

The exact concentration of the compounds of this invention employed in combatting or controlling noxious broadleaf vegetation can vary considerably provided the required dosage (i.e. herbicidal amount) thereof is supplied to the growing plant. From a practical point of view, the manufacturer must supply the agriculturist with a low-cost concentrate or spray base or particulate solid base in such form that, by merely mixing with water or solid extender (e.g. powdered clay or talc) or other low-cost material available to the agriculturist at the point of use, he will have an easily prepared herbicidal spray or particulate solid. In such a concentrate composition, the compound of this invention generally will be present in a concentration of 5 to 95 percent by weight, the residue being any one or more of the well-known herbicidal adjuvants, such as the various surface active agents (e.g. detergents, a soap or other emulsifying or wetting agent), surface active clays, solvents, diluents, carrier media, adhesives, spreading agents, humectants, and the like.

There are a large number of organic liquids which can be used for the preparation of solutions, suspensions or emulsions of the compounds of this invention. For example, isopropyl ether, acetone, methyl ethyl ketone, dioxane, cyclohexanone, carbon tetrachloride, ethylene dichloride, tetrachloroethane, hexane, heptane and like higher liquid alkanes, hydrogenated naphthalenes, solvent naphtha, benzene, toluene, xylene, petroleum fractions (e.g. those boiling almost entirely under 400° F. and having a flash point above about 80° F., particularly kerosene), mineral oils and the like.

The compounds of this invention are preferably supplied to the growing plant in the form of emulsions or suspensions. Emulsions or suspensions are prepared by dispersing the compounds of this invention either per se or in the form of an organic solution thereof in water with the aid of a water-soluble surfactant. The term "surfactant" as employed here and in the appended claims is used as in Volume II of Schwartz, Perry and Berch's "Surface Active Agents and Detergents" (1958 Interscience Publishers, Inc., New York) in place of the expression "emulsifying agent," to connote generically the various "emulsifying agents," "dispersing agents," "wetting agents" and "spreading agents" that are adapted to be admixed with the active compounds of this invention in order to secure better wetting and spreading of the active ingredients in the water vehicle or carrier in which they are insoluble through lowering the surface tension of the water (see also Frear "Chemistry of Insecticides, Fungicides and Herbicides," second edition, page 280). These surfactants include the well-known capillary active substances which may be anion-active (or anionic), cation-active (or cationic), or non-ionizing (or non-ionic) which are described in detail in Volumes I and II of Schwartz, Perry and Berch's "Surface Active Agents and Detergents," (1958 Interscience Publishers, Inc., New York) and also in the November 1947 issue of Chemical Industries (pages 811–824) in an article entitled "Synthetic Detergents" by John W. McCutcheon and also in the July, August, September and October 1952 issues of Soap and Sanitary Chemicals under the title "Synthetic Detergents." The disclosures of these articles with respect to surfactants, i.e. the anion-active and non-ionizing capillary active substances are incorporated in this specification by reference in order to avoid unnecessary enlargement of this specification. The preferred surfactants are the water-soluble anionic surface-active agents and the water-soluble non-ionic surface-active agents set forth in U.S. 2,846,398 (issued Aug. 5, 1958). In general it is preferred that a mixture of water-soluble anionic and water-soluble non-ionic surfactants be employed.

The compounds of this invention can be dispersed by suitable methods (e.g. tumbling or grinding) in solid extending agents either of organic nature and supplied to the plant growing medium in particulate form. Such solid materials include for example, tricalcium phosphate, calcium carbonate, kaolin, bole, kieselguhr, talc, bentonite, fuller's earth, pyrrophillite, diatomaceous earth, calcined magnesia, volcanic ash, sulfur and the like inorganic solid materials and include for example, such materials of organic nature as powdered cork, powdered wood, and powdered walnut shells. The preferred solid carriers are the adsorbent clays, e.g. attapulgus clay. These mixtures can be used for herbicidal purposes in the dry form or by addition of water-soluble surfactants or wetting agents the dry particulate solids can be rendered wettable by water so as to obtain stable aqueous dispersions or suspensions suitable for use as sprays.

In all of the form described above the dispersions can be provided ready for use in combatting noxious vegetation or they can be provided in a concentrated form suitable for mixing with or dispersing in other extending agents. As illustrative of a particularly useful concentrate is an intimate mixture of a compound of this invention with a water-soluble surfactant which lowers the surface tension of water in the weight proportions of 0.1 to 15 parts of surfactant with sufficient of the compound of this invention to make 100 parts by weight. Such a concentrate is particularly adapted to be made into a spray for combatting various forms of noxious broadleaf vegetation by the addition of water thereto. As illustrative of such a concentrate is an intimate mixture of 95 parts by weight of dimethyl 3-phenyl-isothiazole-4,5-dicarboxylate and 5 parts by weight of a water-soluble non-ionic surfactant such as polyoxyethylene derivative of sorbitan monolaurate.

Another useful concentrate adapted to be made into a spray for combatting noxious broadleaf vegetation is a solution (preferably as concentrated as possible) of a compound of this invention in an organic solvent therefor. The said liquid concentrate preferably contains dissolved therein a minor amount (e.g. 0.5 to 10 percent by weight of the new herbicidal agent) of a surfactant (or emulsifying agent), which surfactant is also water-soluble. As illustrative of such a concentrate is a solution of diethyl 3-phenyl-isothiazole-4,5-dicarboxylate in acetone which solution contains dissolved therein a water-soluble polyoxyethylene glycol non-ionic surfactant and a water-soluble alkylaryl sulfonate anionic surfactant.

Of the surfactants aforementioned in preparing the various emulsifiable, wettable or dispersible compositions or concentrates of this invention, the anionic and non-ionic surfactants are preferred. Of the anionic surfactants, the particularly preferred are the well-known water-soluble alkali metal alkylaryl sulfonates as exemplified by sodium decylbenzene sulfonate and sodium dodecylbenzene sulfonate. Of the non-ionic surfactants the particularly preferred are the water-soluble polyoxyethylene derivatives of alkylphenols (particularly isooctylphenol) and the water-soluble polyoxyethylene derivatives of the mono-higher fatty acid esters of sorbitan containing 15 to 30 mols of ethylene oxide per mol of sorbitan mono-ester of alkylphenol.

In all of the various dispersions described hereinbefore for herbicidal purposes, the active ingredient can be one or more of the compounds of this invention. The compounds of this invention can also be advantageously employed in combination with other pesticides, including, for example, nematocides, bactericides, and insecticides. In this manner it is possible to obtain mixtures which are effective against a wide variety of pests and other forms of noxious life.

What is claimed is:

1. A 3-aryl-isothiazole-4,5-dicarboxylate of the formula

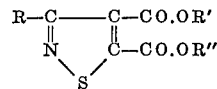

wherein R is selected from the group consisting of phenyl, p-tolyl, p-methoxyphenyl, p-chlorophenyl and p-nitrophenyl, and wherein R' and R" are selected from the group consisting of lower alkyl and lower alkoxyalkyl.

2. A compound of claim 1 wherein R is phenyl and wherein R' and R" are lower alkyl.

3. A compound of claim 2 wherein R' and R" are methyl, which compound is dimethyl 3-phenyl-isothiazole-4,5-dicarboxylate.

4. A compound of claim 2 wherein R' and R" are ethyl, which compound is diethyl 3-phenyl-isothiazole-4,5-dicarboxylate .

5. A method of making a compound of claim 1 which comprises bringing together and heating to evolve carbon dioxide substantially equimolecular proportions of a 5-aryl-3,4-oxathiazol-2-one of the formula

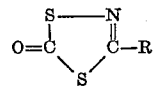

and an acetylenedicarboxylate of the formula

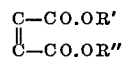

wherein R, R' and R" have the same significance as in claim 1.

6. A method of claim 5 wherein R is phenyl and wherein R' and R" are lower alkyl.

7. A method of claim 5 wherein R is phenyl and wherein R' and R" are methyl.

References Cited

Cation et al.: Chem. Abstracts, 60:6857g (1964).

ALEX MAZEL, Primary Examiner

R. J. GALLAGHER, Assistant Examiner

U.S. Cl. X.R.

71—90; 260—302 R